Feb. 28, 1967  F. A. SUMMERLIN  3,306,040
HYDRAULIC TRANSMISSION
Filed June 7, 1965
7 Sheets-Sheet 3

INVENTOR
FREDERICK A. SUMMERLIN
BY
WATSON, COLE, GRINDLE & WATSON
ATTORNEYS

Feb. 28, 1967 F. A. SUMMERLIN 3,306,040
HYDRAULIC TRANSMISSION
Filed June 7, 1965 7 Sheets-Sheet 4

INVENTOR
FREDERICK A. SUMMERLIN
BY
WATSON, COLE, GRINDLE & WATSON
ATTORNEYS

Feb. 28, 1967  F. A. SUMMERLIN  3,306,040
HYDRAULIC TRANSMISSION
Filed June 7, 1965  7 Sheets-Sheet 5

INVENTOR
FREDERICK A. SUMMERLIN
BY
WATSON, COLE, GRINDLE & WATSON
ATTORNEYS

Feb. 28, 1967    F. A. SUMMERLIN    3,306,040
HYDRAULIC TRANSMISSION
Filed June 7, 1965    7 Sheets-Sheet 6

INVENTOR
FREDERICK A. SUMMERLIN
By
WATSON, COLE, GRINDLE & WATSON
ATTORNEYS

United States Patent Office 3,306,040
Patented Feb. 28, 1967

3,306,040
HYDRAULIC TRANSMISSION
Frederick Arthur Summerlin, 58 Townsend Lane,
Harpenden, Hertfordshire, England
Filed June 7, 1965, Ser. No. 462,016
Claims priority, application Great Britain, June 8, 1964,
23,669/64; Jan. 11, 1965, 1,200/65
12 Claims. (Cl. 60—51)

This invention relates to power transmission mechanism for example a mechanism suitable for transmitting the power from the engine to the wheels of a motor car.

The invention is related to the invention which was the subject of United States patent application Serial No. 339,377, now Patent No. 3,200,590, issued August 17, 1965.

In that specification is described and claimed a power transmission mechanism in which the torque transmitted is automatically adjusted as a function of the ratio of the input to output speeds by varying the time during each pump cycle over which fluid pressure is transmitted in dependence on this ratio. In the preferred embodiment a positive displacement hydraulic pump is arranged to be driven by an engine and fluid lines from the pump lead to a hydraulic motor for driving the load.

An object of the present invention is to provide an arrangement for use in such a situation where the engine is to be started with the load stationary to ensure that full demand is not made on the engine and pump until a certain pump speed has been achieved.

According to the present invention a passage is provided shunting the fluid lines from the pump to the motor which passage contains a displaceable member.

The displaceable member, which might comprise one or more reciprocating pistons or might comprise merely the hydraulic fluid in the shunting passage which in this case could be a long pipe of coiled or convoluted form, can merely reciprocate in the passage as the pump operates allowing the pump fluid to circulate, by-passing the motor.

When a sufficient pump pressure is achieved it can be supplied to the motor. For example the mechanism preferably includes a pressurised accumulator to which liquid in excess of the requirement of the motor and displaceable member in a cycle is pumped and the displaceable member is connected across the accumulator. With such an arrangement, at pump pressure less than the accumulator base pressure the displaceable member merely reciprocates whereas at greater pressure the pump fluid can be applied to the motor. Conveniently there is in a passage across the supply lines to the motor a relief valve set just below the accumulator base pressure connected in series with a valve controlled to be shut at speeds above the speed where fluid pressure first just equals the accumulator base pressure and to open at speeds lower than this.

The invention may be carried into practice in various ways and one embodiment will now be described by way of example with reference to the accompanying drawings of which:

Figure 1:
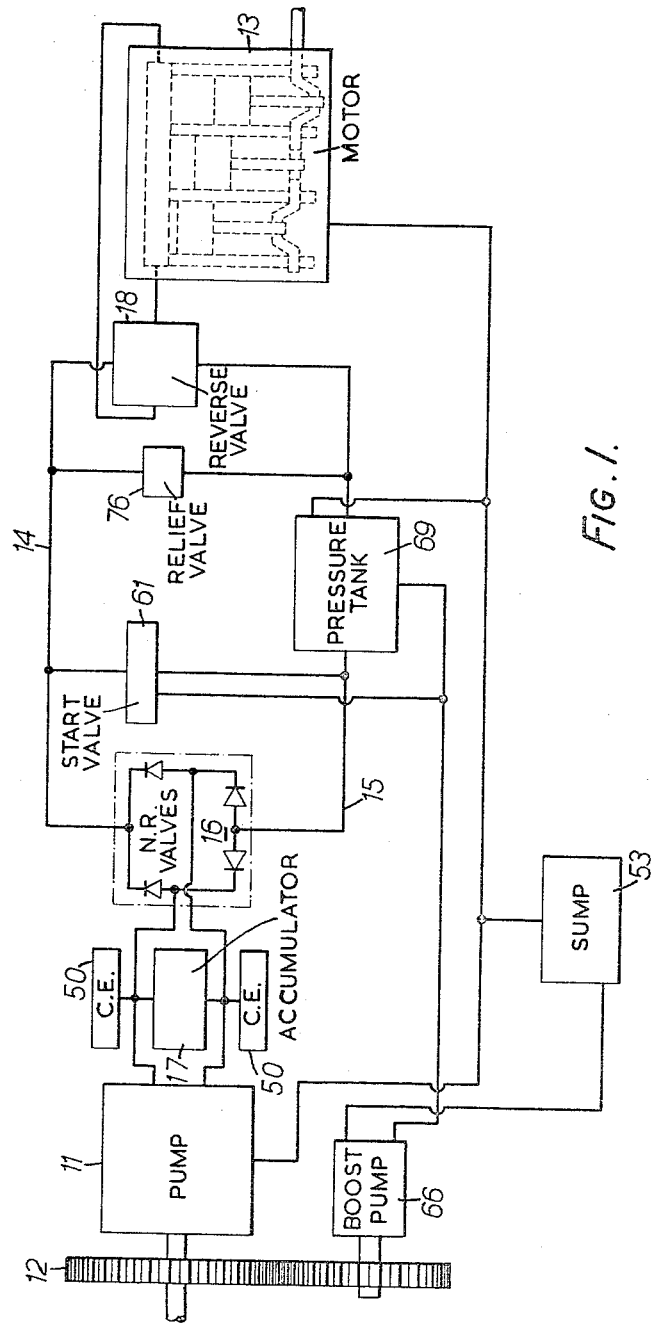
FIGURE 1 is a diagram showing the general layout of the automatic transmission.
Figure 3:
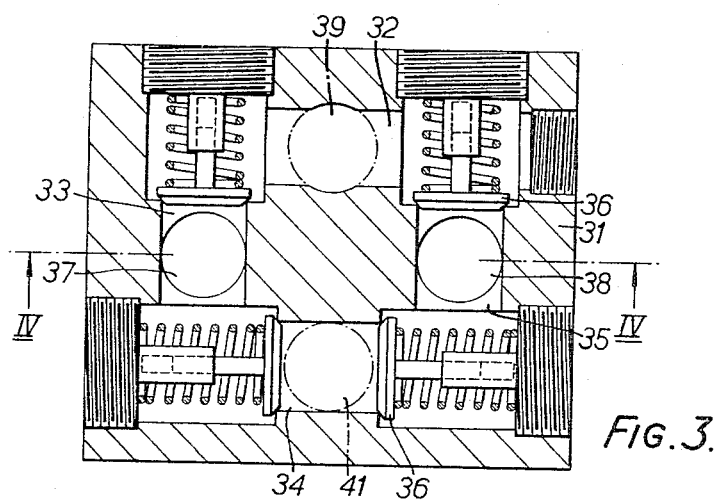
Figure 4:
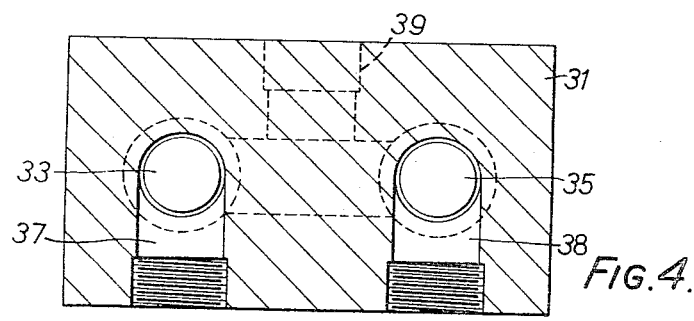
Figure 5:
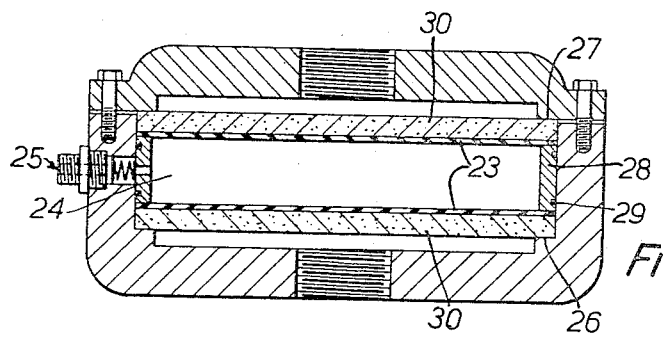
Figure 6:
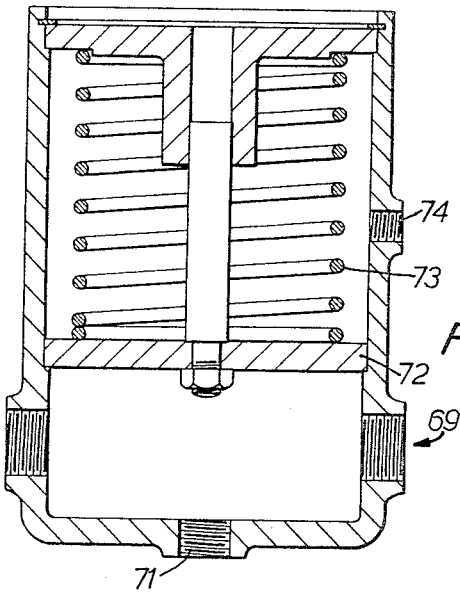
Figure 7:
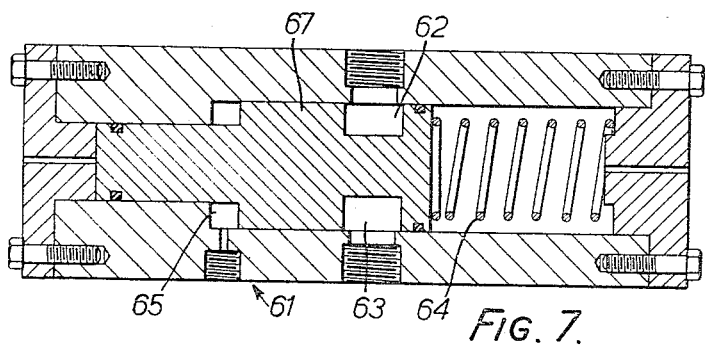
Figure 8:
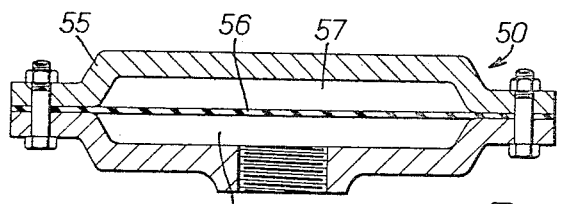
Figure 9:
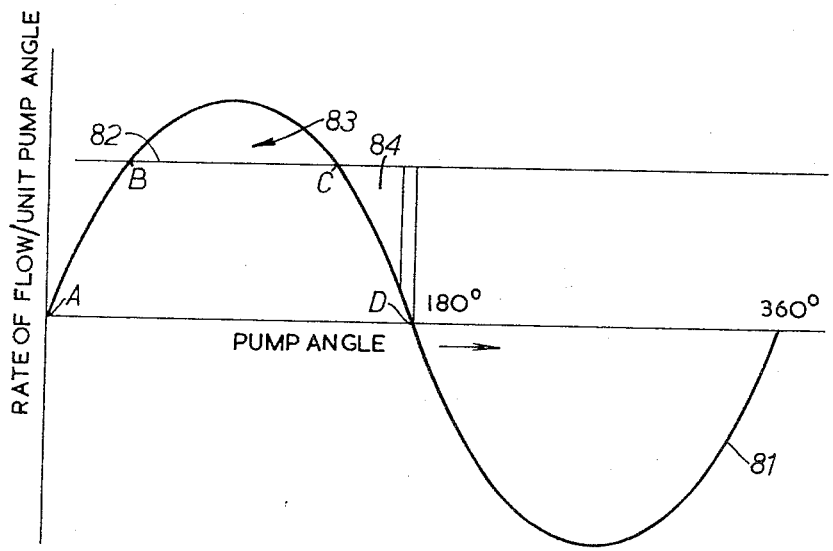
Figure 10:
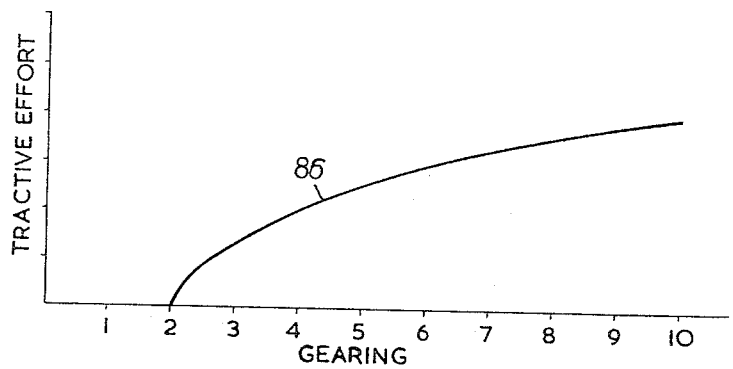
Figure 11:
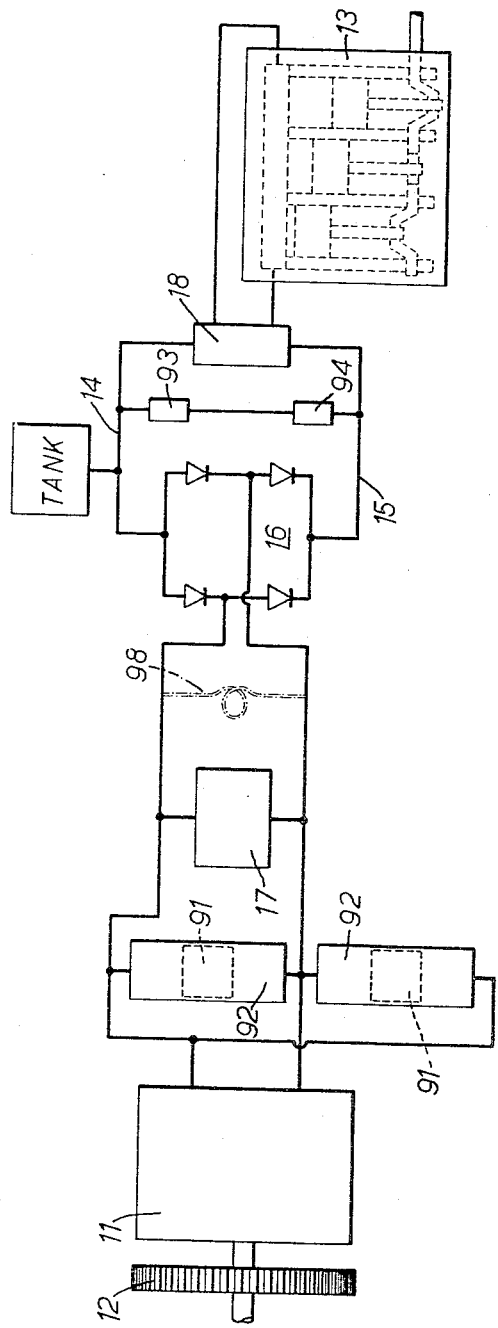
Figure 12:
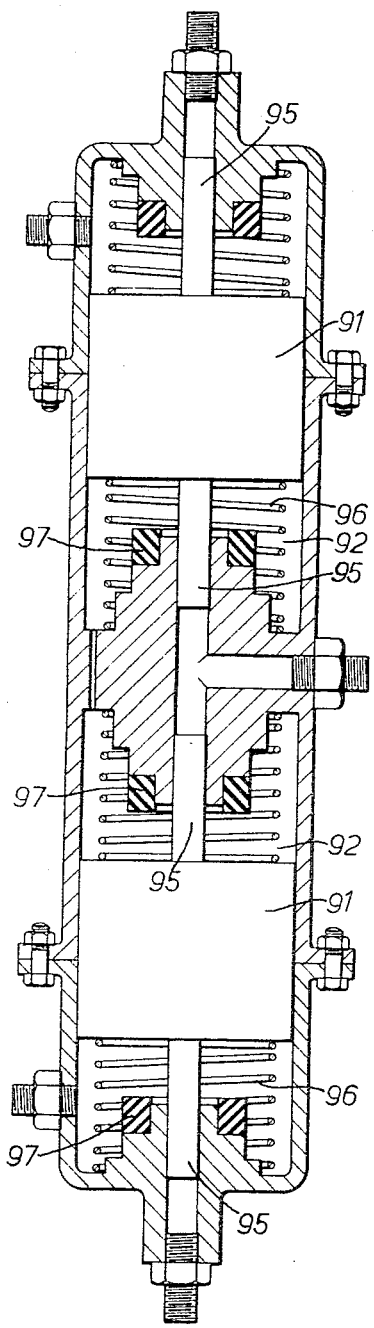

FIGURE 3 is a sectional elevation of the non-return valve assembly of the transmission of FIGURE 1, FIGURE 4 is a section on the line IV—IV in FIGURE 3, FIGURE 5 is a sectional elevation of the accumulator in the transmission of FIGURE 1, FIGURE 6 is a sectional elevation of the pressurised tank of the transmission in FIGURE 1, FIGURE 7 is a sectional elevation of the starting valve of the transmission in FIGURE 1, FIGURE 8 is a sectional elevation of one of the cavitation eliminators of the transmission in FIGURE 1, FIGURES 9 and 10 are graphs used in describing the operation of the transmission of FIGURE 1, FIGURE 11 is a diagram similar to FIGURE 1 showing two modifications of the transmission, and FIGURE 12 is a section through a shunting piston shown diagrammatically in FIGURE 11.

The transmission of FIGURE 1 may be used for driving the wheels of a motor car from an internal combustion engine. The engine drives a pump 11 through 2:1 reduction gearing, and the wheels are driven by a three cylinder in-line reciprocating hydraulic motor 13 developing 80 H.P. at 1500 r.p.m. and 1200 pounds per square inch. It has an overhead rotary valve driven from the crankshaft.

The hydraulic pump 11 is a two cylinder swash plate pump each of whose cylinders is connected to inlet and delivery lines 14 and 15 through an arrangement of four non-return valves 16 arranged in a manner analogous to the full-wave rectifier circuit of electrical practice. The pump cylinders are also connected directly each to one chamber of a double accumulator 17.

A conventional simple reversing valve 18 enables the direction of the operation of the motor 13 to be changed.

*Accumulator 17*

It is convenient at this stage to describe in more detail the construction of the accumulator which is shown in elevation in FIGURE 5. The accumulator has two fluid chambers one connected to each cylinder of the pump 11. The two chambers are separated by rubber diaphragms 23 from a compressed air spring constituted by the interior 24 of the bag defined by the diaphragms.

When both chambers are discharged as shown in FIGURE 5 the volume of compressed air in the bag 24 is approximately that of one cylinder swept volume of the pump 11 and the pressure of air under these conditions can conveniently be arranged to be, say 1000 pounds per square inch. This air is supplied through the inlet 25. The diaphragms are supported by porous metal plates 30, for example formed of sintered metal, and are held in position between shoulders 26 and 27 on the casing and cover respectively of the accumulator, being held apart by a cylindrical spacer 28 sealed in the body of the accumulator by sealing rings 29. The edges of the rubber diaphragms 23 are gripped between the plates 30 and the spacer 28.

*Non-return valve assembly*

This assembly is shown in FIGURES 3 and 4 and consists of a block 31 formed with a rectangular network of passages 32, 33, 34 and 35, communicating with each other at the corners of the rectangle through spring-loaded non-return valves 36.

The connections from the two pump cylinders are at 37 and 38 in the passages 33 and 35 respectively; the outlet to the delivery line 14 is at 39 in passage 32, and the inlet from the inlet line 15 is at 41 in the passage 34.

It will be clear that oil entering at 37 or 38 under pressure can pass through non-return valves to the delivery 39 but not to the inlet 41 and this is diagrammatically illustrated at 16 in FIGURE 1. Also fluid can circulate through the motor 13 and the assembly 16, if the pump cannot supply fluid to meet the demand of the motor.

*The pump 11*

Figure 2:
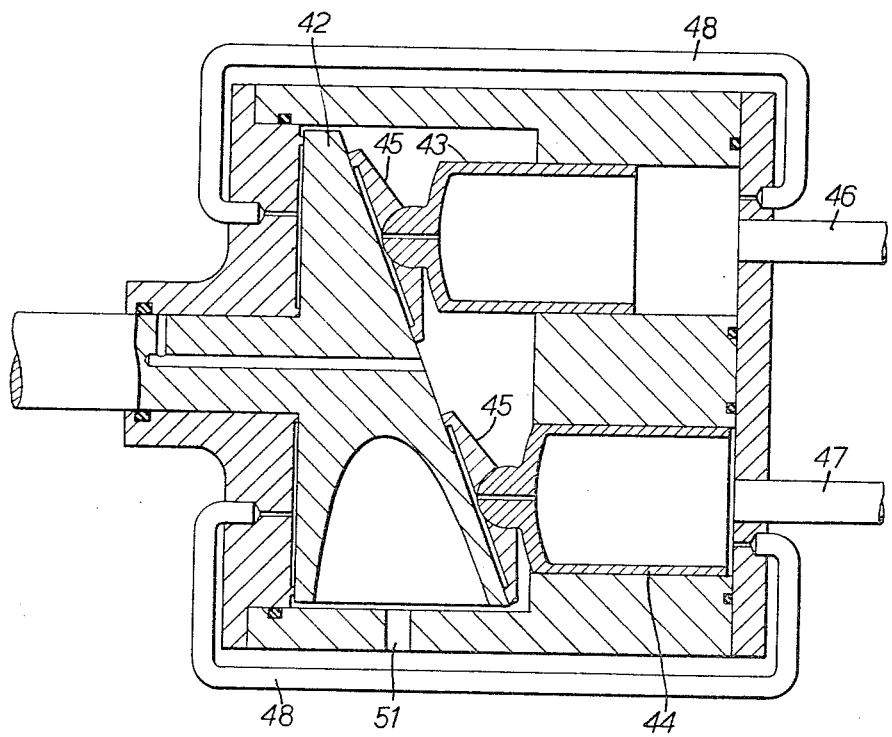
FIGURE 2 is a sectional elevation of the pump in the transmission of FIGURE 1.

This is a two cylinder swash plate shown in FIGURE 2 having a swash plate 42 driven from the engine and reciprocating cylinders 43 and 44 bearing on the swash plate through hydrostatic slippers 45. The delivery lines to the non-return valve arrangement 16 are shown at 46 and 47.

Cylinder pressure is supplied over the lines 48 to areas at the rear of the swash plate 42 equal to the slipper areas in order to balance hydrosatic thrust.

The outlet 51 from the pump casing 52 leads to a sump 53 shown in FIGURE 1.

*Cavitation eliminator*

A cavitation eliminator 50 is shown in sectional elevation in FIGURE 8. One of these is connected at each pump delivery line to provide a source of oil enabling the non-return valves 36 in the assembly 16 to have time to operate.

The eliminator comprises a casing 55 having a diaphragm 56 separating a cavity 57 containing air at atmospheric pressure from a chamber 58 in communication with the pump delivery.

When the cylinder is pumping, the diaphragm compresses the air at 57 to the cylinder pressure, and when the suction stroke begins, virtually the full volume of the cavity is available for supplying oil to the cylinder in the period before the non-return valves open. This prevents the cylinder pressure falling below atmospheric pressure and cavitation occuring.

*Starting*

It is desirable when starting the engine to short circuit the pump 11 until the engine speed has risen to say 750 to 1000 r.p.m.

For this purpose a starting valve 61 is connected across the delivery and input lines 14 and 15 as shown in FIGURE 1. The valve is shown in elevation in FIGURE 7 and normally provides communication between the two parts of the short circuiting path by way of the ports 62 and 63.

The valve is operated against the pressure of a spring 64 by hydraulic pressure supplied at 65 from a boost pump 66 in FIGURE 1 which is a conventional gear pump driven through gearing 12 from the pump shaft. The pump 66 draws its supply from the sump 53 and develops a pressure across the leakages of the circuit into which it feeds proportional to engine speed. This pressure is applied to the chamber 65 and as the speed rises the valve member 67 moves to the right in FIGURE 7 against the spring until the short circuit is removed.

During this starting period and during normal operation, the system is pressurised from the boost pump 66 which charges a pressurised tank 69 in the input line 15. The tank 69 is shown in elevation in FIGURE 6 and it will be seen that as fluid is supplied from the pump 66 at 71 the piston 72 is moved upwards against a spring 73 until at a pre-determined pressure a port 74 leading to the sump 53 is opened. The spring is set in this position to maintain the pressure of 100 pounds per square inch in the system.

There is also a conventional relief valve 76 set at 2000 pounds per square inch connected across the inlet and delivery lines.

Also the casing of the motor 13 communicates with the sump 53.

The boost pump 66 can also be used to supply lubricant to the pump and motor bearings.

*Operation*

Each cylinder of the pump 11 can be considered to be a generator of a sinusoidal oil flow. The delivery from one cylinder over a complete cycle of the pump is shown as the sine wave 81 of FIGURE 9. The positive half of the sine wave represents the discharge stroke and the negative half the suction stroke. Superimposed on this diagram, a line 82 represents the volume of oil required by the motor 13 over this period.

In the interest of simplicity, 82 has been shown straight, although strictly for a 3-cylinder pump the fluid required by the pump will fluctuate six times per cycle.

The lines 81 and 82 are plotted as rate of flow/unit pump angle to a base of pump angle $\theta$. Thus the approximation to a sine wave 81 representing the pump output does not change as the pump rotational speed changes but if the motor demand is constant, motor demand/unit pump angle will be inversely proportional to pump rotational speed. Hence the straight line 82 representing motor demand/unit pump angle will be close to the $\theta$ axis at high pump rotational speeds and will move farther away from the $\theta$ axis as pump speeds are reduced. The pump speed at which the motor demand is equal to the peak pump output, is called synchronous speed.

When the pump speed is greater than synchronous the line 82 intersects the sine wave as shown in FIGURE 9. During the part of the cycle A–B, the pump output is insufficient to supply the load demand and the motor flow circulates through the non-return valve bridge 16 and by-passes the pump cylinders 43, 44. No pressure is applied to the motor 13 during this period. At B the pump flow exceeds the motor demand and between B and C oil is supplied to the motor. Excess oil which is represented by area 83 is stored in the accumulator 17. Thus during B–C oil at a pressure determined by the accumulator pressure is supplied to the motor. During the period C–D oil which has been stored during B–C is released, some of it supplying the motor over this period and some being returned to, and doing work on, the pump. This is shown as area 84 which is equal to area 83. Pressure is maintained on the motor during C–D also. Both cylinders of the pump operate in a similar manner. Thus pressure is applied to the motor over a proportion of the cycle determined by the intercept of the motor demand line 82 on the pump discharge curve 81. As pump speed is reduced the proportion of the cycle over which pressure is applied to the motor is reduced. If the motor demand is increased, i.e., the vehicle is moving faster, the active part of the cycle is once again reduced. It is apparent that the proportion of time during which pressure is applied to the motor is dependent only on the ratio of pump delivery to motor demand, i.e, to the ratio between engine speed and road wheel speed. This ratio may be called the "gearing."

It will be noted that if in FIGURE 9 the motor demand is equal to about one half the peak pump delivery, the period B–D during which pressure is applied by one pump cylinder becomes equal to one half of the pump cycle. Hence, since the other cylinder supplied pressure oil during the other half of the cycle, pressure is applied continuously to the motor and further increase in tractive effort due to pressure being applied for a greater proportion of the cycle cannot be produced by increasing pump speed beyond this point. However, further increase in tractive effort will result from an increase in pump speed since the amount of oil stored in the accumulator during the cycle will be increased and the pressure of the air spring 24 will increase a corresponding amount. Once again tractive effort will be a function of "gearing" only.

FIGURE 10 shows a tractive effort plotted to a base of "gearing" for transmission in which the pump details are:

Pump discharge per revolution—12 cubic inches
Accumulator spring volume (max.)—6 cubic inches
Accumulator pressure (discharged)—1000 pounds per square inch

*Motor details*

The motor drives the rear wheels of a motor car directly, 1500 r.p.m. producing 90 m.p.h. road speed. Motor flow per revolution is 18 cubic inches with the single motor driving two wheels via a differential.

The curve 86 shows a portion between "gearings" of 2 and 4 in which increases in tractive effort are produced principally by increases in the proportion of the cycle during which pressure is applied to the hydraulic motor. The effects of increase in quantity of oil stored in the accumulator are small over this "gearing" range. In the case shown with a static accumulator air pressure of 1000 pounds per square inch, the mean pressure increases to 1200 pounds per square inch at a "gearing" of slightly over 4 when torque is first applied to the driving wheels continuously.

For "gearings" of over 4 the increase in tractive effort is produced by increases in the quantity of oil stored in the accumulator 17 and the consequent increase in working pressure which at a "gearing" of 10 reaches 2000 pounds per square inch. At this pressure, the relief valve 76 operates to prevent any further increase in pressure.

This curve 86 can therefore be modified in a number of ways. The slope of the curve at higher "gearings" can be influenced by changes in the volume of air in the accumulator. The slope of the curve at lower "gearings" can be modified by changes in the pressure to which the accumulator 17 is initially charged. The whole "gearing" scale can be multiplied or divided by a factor by changing the ratio of swept volumes of pump and motor.

A modification of the system just described is shown in FIGURE 11. The start valve 61 and the connection for operating it from the boost pump 66 are omitted and replaced by a pair of double acting free pistons each in its own cylinder, the two cylinders being connected with their ends communicating respectively with the two sides of the accumulator 17, as shown at 91 and 92.

As shown in FIGURE 12 the cylinders 92 are physically in line. One side of the accumulator 17 is in communication with the inner ends of the cylinders and the other side is in communication with the outer ends so that movements of the pistons 91 are equal and opposite and inertia forces are balanced.

As shown in FIGURE 12 the pistons 91 have shafts 95 sliding in the cylinder ends so that the necessary piston mass can be achieved without requiring too great a piston area. The pistons are lightly spring centralised by springs 96 and have end buffers 97 in the form of hard rubber rings set in the end bosses of the cylinders.

For a pump discharge per revolution of five cubic inches of oil and an accumulator maximum spring volume of three cubic inches with a base pressure when discharged of 1,200 lbs. per square inch a piston mass of about 15 lbs. may be used with a stroke of 2 inches. This is the total mass of the two pistons 91 which are only split to balance inertia forces as described above.

If a peak pump pressure of 1,200 lbs. per square inch is produced at a low engine speed of 1,850 revolutions per minute, a tractive effort of approximately 179 lbs. could be produced. The total cylinder swept volume will be 2.5 cubic inches, that is, equal to one pump cylinder swept volume.

At starting of the engine, assuming the vehicle is stationary, the pumped liquid will merely cause the pistons 91 to reciprocate in their cylinders accommodating the discharge from the pump cylinders 43 and 44 in the two ends of the cylinder 92 until at engine speeds when the pump pressure exceeds the accumulator base pressure of 1,200 lbs. per square inch the pump starts to charge the accumulator 17.

As the pump speed increases above this value, the amplitude of the piston 91 will decrease and the system will tend towards the mode of invention described with reference to FIGURE 1, the effect of the shunt pistons becoming progressively less as pump speed increases.

When the vehicle is stationary the change over is quite sharp and if the accumulator has a large air spring the movement of the pistons 91 will rapidly reduce until they are stationary. Also if leakage were low the piston would not start moving again as engine speed fell. With a limited air volume in the accumulator the pressure in the system would tends to rise and the relief valve 76 might open before the pistons 91 were stationary.

It is desirable for traction purposes that the change from the mode with the accumulator containing no fluid to the mode where the accumulator is charged should be fully reversible and so there is connected across the supply lines to the motor 13 a relief valve 93 set just below the accumulator base pressure of 1,200 lbs. per square inch in series with a valve 94 controlled by engine speed to shut at speeds above 1,850 revolutions per minute where pump pressure first just equals this accumulator base pressure and to be open at a speed lower than this. Alternatively the valve 94 could be controlled by the throttle pedal of the vehicle so that it is shut at those settings which produce an engine speed approaching 1850 r.p.m. and open when the throttle is shut. Thus, the accumulator cannot remain charged at low engine speeds.

In an alternative arrangement the pistons and cylinders 91 and 92 are replaced by a long fluid line shown by dashed lines at 98 in FIGURE 11 which is connected between the fluid passages from the pump 11 to the non-return valve arrangement 16. The mass of liquid in the fluid passage acts as a reciprocating mass and the arrangement in operation is somewhat similar to that described above. The fluid passage forms a closed circuit between the pump outlets and inertia forces will be substantially balanced if the ends of the passage are reasonably close together so that duplication is not necessary, and there is no question of providing spring centralising devices and end stops. Moreover the fluid passage can be coiled in any convenient manner in accordance with the available space.

In the particular transmission described above, the length of pipe might be 7 feet with an internal diameter of 0.64 inch. This pipe could have a pressure drop of 5 lbs. per square inch per foot run using oil of a suitable viscosity and a total drop of 35 lbs. per square inch over the 7 feet of pipe is considered satisfactory.

Although the piston and cylinder arrangement 91 and 92 and the alternative closed circuit fluid connection 98 have been described in association with the accumulator 17 it is also possible to use either of these features in a system which does not employ an accumulator and the effect would be still to allow the pump discharge to circulate at low engine speeds when there is no demand from the motor.

In a modification, which might for example be used in an application with two different motors such as 13 driving independently opposite wheels of a motor car, the cylinders of the pump 11 are divided into two groups each with its own accumulator and shunt arrangement and each of which is used to provide the fluid for driving a different one of the motors. This arrangement allows for a differential effect, for example when the car is turning a corner, without the use of gearing, and also maintains torque on one driving wheel if the other driving wheel slips.

What I claim as my invention and desire to secure by Letters Patent is:

1. In a power transmission mechanism including a positive displacement hydraulic pump means having at least two pumping sides operated out of phase by an engine and connected separately by respective fluid lines to a hydraulic motor for driving a load means responsive to the speeds of the pump and motor, the improvement comprising means for determining the speeds during the pump operation at which fluid pressure is transmitted from said pump to said motor, said means including a passage shunting said fluid lines between the pump and the motor and a displaceable member reciprocable longitudinally along said passage in response to the difference in pressure between said fluid lines whereby to accommodate the flow of fluid and thus prevent the transmittal of the same to said motor at relatively low speeds.

2. A power transmission mechanism as claimed in claim 1 in which the displaceable member comprises at least one reciprocating piston.

3. A power transmission mechanism as claimed in claim 2 in which the displaceable member comprises two pistons, which are aligned and arranged to move in opposite directions, for balancing inertia forces.

4. A power transmission mechanism as claimed in claim 1 in which the displaceable member comprises hydraulic fluid in the shunting passage.

5. A power transmission mechanism as claimed in claim 4 in which the passage comprises a long pipe of convoluted form.

6. A power transmission mechanism as claimed in claim 1 including a pressurised accumulator for receiving liquid in excess of the requirement of the motor and displaceable member in a cycle, the passage containing the displaceable member being connected across the accumulator.

7. A power transmission mechanism as claimed in claim 6 including a passage connected across the motor, a relief valve in the passage set just below the accumulator base pressure, and a second valve connected in series with the relief valve, controlled and means for controlling the second valve to be shut at speeds above the speed where fluid pressure first just equals the accumulator base pressure and to open at speeds lower than this.

8. A power transmission comprising an engine, a positive displacement hydraulic pump means having at least two pumping sides operated out of phase by said engine, at least two fluid lines, a hydraulic motor, said pumping sides being connected separately by said fluid lines to said hydraulic motor, a passage shunting said fluid lines between the pump and the motor and a displaceable member reciprocable longitudinally along said passage in response to the difference in pressure between said fluid lines whereby to accommodate the flow of fluid and thus prevent the transmittal of the same to said motor at relatively low speeds.

9. A power transmission as claimed in claim 8 in which the displaceable member comprises at least one reciprocating piston.

10. A power transmission as claimed in claim 8 in which the displaceable member comprises hydraulic fluid in the shunting passage.

11. A power transmission as claimed in claim 10 in which the passage comprises a long pipe of convoluted form.

12. A power transmission as claimed in claim 8 including a pressurised accumulator for receiving liquid in excess of the requirements of the motor and the displaceable member in a pump cycle, the passage containing the displaceable member being connected across the accumulator.

References Cited by the Examiner

UNITED STATES PATENTS 3,135,087  6/1964  Ebert _____ 60—52
3,221,501  12/1965  Seamone et al. _____ 60—52

EDGAR W. GEOGHEGAN, *Primary Examiner.*